(12) United States Patent
Varnau

(10) Patent No.: US 7,156,384 B1
(45) Date of Patent: *Jan. 2, 2007

(54) MULTI-PURPOSE FLEXIBLE JAW UNIVERSAL VISE WITH REMOVABLE CLAMP FEATURE

(75) Inventor: Bernard T. Varnau, Cincinnati, OH (US)

(73) Assignee: American Workholding, Inc., Cincinnati, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 3 days.

(21) Appl. No.: 09/316,876

(22) Filed: May 21, 1999

Related U.S. Application Data

(60) Provisional application No. 60/086,609, filed on May 22, 1998.

(51) Int. Cl.
*B23Q 3/08* (2006.01)

(52) U.S. Cl. .................... 269/25; 269/20

(58) Field of Classification Search ............ 269/25, 269/32, 283, 280, 20, 43
See application file for complete search history.

(56) References Cited

U.S. PATENT DOCUMENTS

| | | | | |
|---|---|---|---|---|
| 491,222 A * | 2/1893 | Pellet | | 269/25 |
| 2,517,941 A * | 8/1950 | Stubbs | | 269/25 |
| 2,706,922 A * | 4/1955 | Allen | | 269/25 |
| 2,947,275 A * | 8/1960 | Edmonds | | 269/25 |
| 4,251,065 A * | 2/1981 | McDougal | | 269/25 |
| 5,806,841 A * | 9/1998 | Hebener | | 269/25 |
| 6,079,704 A * | 6/2000 | Buck | | 269/242 |

* cited by examiner

*Primary Examiner*—Lee D. Wilson
(74) *Attorney, Agent, or Firm*—Frost Brown Todd LLC

(57) ABSTRACT

A flexible hydraulic vise that is actuated hydraulically along the entire length of the jaw travel. The vise includes master jaws disposed in a complementary shaped tracks, connected to pistons by pins. Top jaws with spring loaded ball detents are secured to the master jaws by a dove-tail notch connection. Internal passageways allow pressure to be delivered to either side of pairs of the pistons disposed in the bores, allowing the clamping force to be exerted inwardly or outwardly.

19 Claims, 8 Drawing Sheets

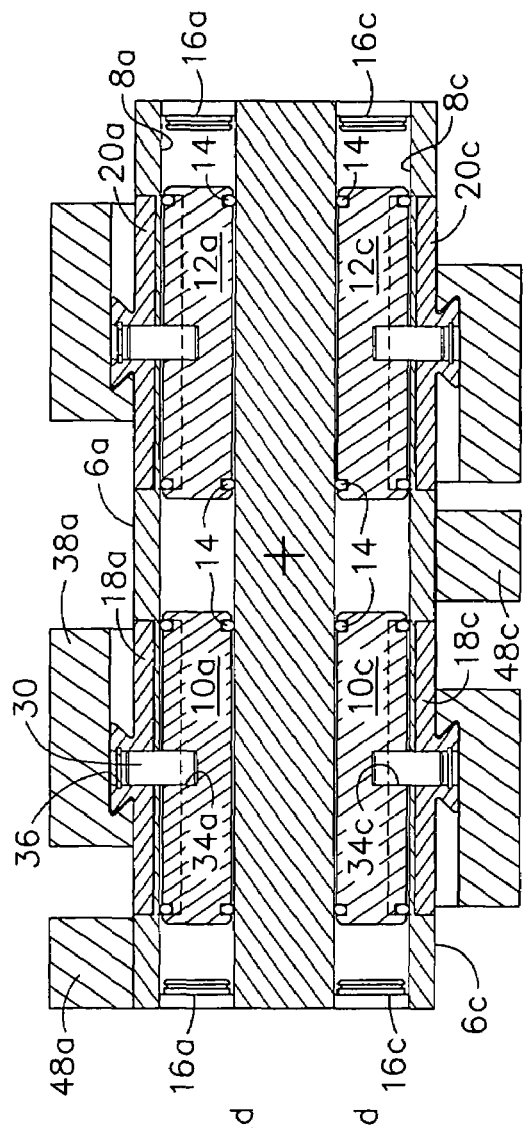
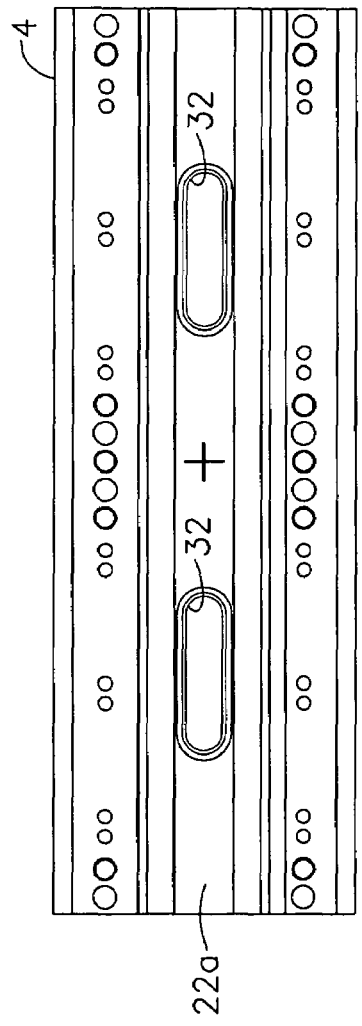
FIG. 3
FIG. 4
FIG. 2

MULTI-PURPOSE FLEXIBLE JAW UNIVERSAL VISE WITH REMOVABLE CLAMP FEATURE

This application claims priority of U.S. Provisional Patent Application Ser. No. 60/086,609, filed on May 22, 1998, the disclosure of which is incorporated herein by reference.

TECHNICAL FIELD

The present invention relates generally to vises, and is particularly directed to a hydraulic vise. The invention will be specifically disclosed in connection with a hydraulic vise having up to four working faces and in which the jaws are hydraulically actuated through out their full stroke of travel.

BACKGROUND OF THE INVENTION

Vice systems and clamping systems are well known, including one or more movable jaws which are positioned to secure a workpiece in place. Workpieces may be held between movable jaws and fixed jaws, or just between movable jaws. Vises are frequently carried by pallets which are shuttled into the appropriate position for machining. In such applications, while parts on one pallet are being machined, finished parts can be unloaded and unfinished parts loaded on vises carried by other pallets.

Most prior art vises utilize a mechanically driven mechanism, such as a screw, either alone or in conjunction with hydraulic actuation. In use, the mechanical mechanism advances the one or more movable jaws to a position proximal to the workpiece. For a mechanical system, the mechanical mechanism provides the entire clamping force, whereas in a combination system, the jaws are hydraulically advanced the last portion of their stroke to contact and secure the workpiece in place.

Mechanical systems increase the time required to load parts and are difficult to automate economically. Obtaining accurate and repeatable clamping forces and accurate positioning with mechanical systems can be difficult. While combination mechanical/hydraulic systems can be better than purely mechanical systems, they still suffer many of the same drawbacks.

Additionally, significant impacts can be exerted on the part by the cutting tool, giving rise to the possibility that the workpiece may shift, causing reject parts, or allow the part to be "caught" by the cutting tool and ripped out of the vise. It is possible for a caught part to be forcefully thrown from the vise and cause injury. If aluminum or other soft material top jaws are used, impacts delivered to the workpiece and transmitted to the jaws can result in deforming the jaws and allowing the part to become loose. To overcome this, mechanical vises have to be mechanically adjusted, such as by the operator, to take up the slack. A hydraulic vise can take up the slack, making the use of aluminum jaws much safer.

There is a need in the art for a vise which is fully hydraulic, which allows the operation of the vise to be automated.

SUMMARY OF THE INVENTION

It is an object of this invention to obviate the above-described problems and shortcomings of the prior art heretofore available.

It is another object of the present invention to provide a hydraulic vise which is fully hydraulic.

It is yet another object of the present invention to provide a hydraulic vise in which the entire travel of the movable jaws is hydraulically actuated.

It is another object of the present invention to provide a vise in which the clamping direction can be easily reversed.

It is another object of the present invention to provide a vise which reduces or eliminates the above identified dangers with jaws made of a soft malleable material such as aluminum.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, there is provided a vise comprising a body with one or more internal bores, with each bore having one or more pistons disposed therein. Each piston is connected to a respective master jaw which is slidabley carried in a jaw track formed in or disposed adjacent a face of the vise body. The piston and master jaw move concomitantly. The master jaw carries a top jaw, or an alternative workpiece holder, such that workpieces or the workpiece holder may be securely held in place. The movement of the master jaw is accomplished hydraulically rather than using a mechanical mechanism.

In accordance with another aspect of the present invention, the piston may include an accumulator.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 2 is an end view of a vise body constructed in accordance with the present invention.

FIG. 3 is a cross sectional view of the vise body taken along line 3—3 of FIG. 2.

FIG. 4 is a top view of the vise body of FIG. 2.

Reference will now be made in detail to the present preferred embodiment of the invention, an example of which is illustrated in the accompanying drawings.

DETAILED DESCRIPTION OF THE PREFERRED EMBODIMENT

Figure 1:
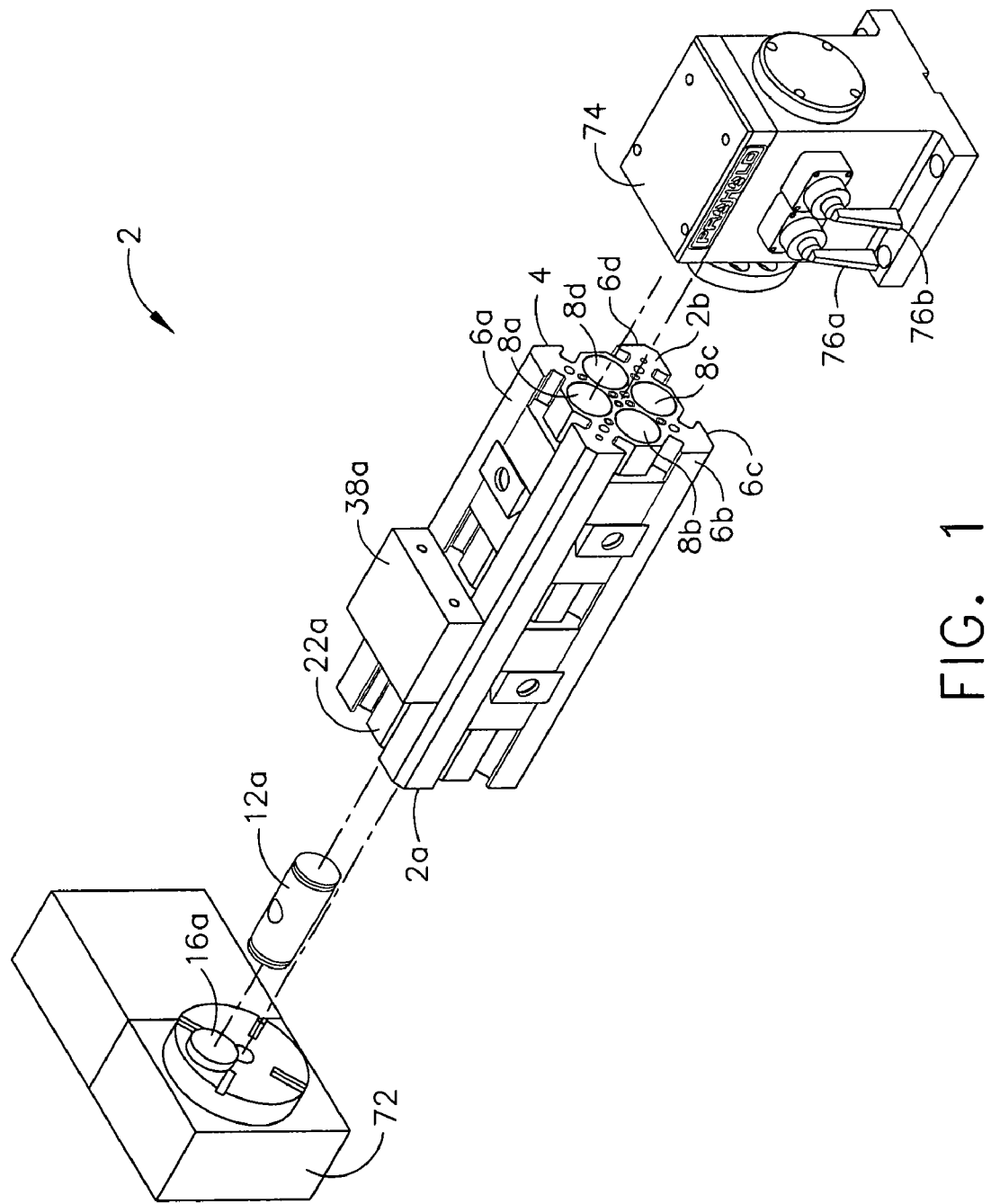
FIG. 1 is an exploded perspective view of a hydraulic vise in accordance with the present invention.

Referring now to the drawings in detail, wherein like numerals indicate the same elements throughout the views, FIG. 1 is an exploded view of a vise constructed in accordance with the present invention. The hydraulic vise, generally indicated by the numeral 2, includes body 4, preferably, but not necessarily made of one piece. Body 4 includes four faces, 6a, 6b, 6c and 6d. As described below, the vise may have only one face, or any number of faces which are appropriate for the application, for example five, six or more faces. As can also be seen in FIGS. 2 and 3, each face 6a–d has an associated bore 8a, 8b, 8c and 8d. For simplicity of explanation, since the construction a of each face 6a–d and bore 8a–8d are the same, only one face and associated bore will be in detail, it being understood that the description applies to all four faces.

Bore 8a includes pistons 10a & 12a disposed therein. The diameter of pistons 10a & 12a depend on the clamping loads desired in conjunction with the hydraulic pressure. In one embodiment the piston has a nominal diameter of 2 inches. Each piston 10a and 12a has an O-ring 14 disposed in an O-ring groove at either end of the piston 10a and 12a, forming a seal with bore 8a. Other suitable seals may also be used, whether carried by piston 10a or 12a, or fixed within bore 8a. Bore 8a is sealed at both ends by end caps 16a. End caps 16a may be threaded caps with O-ring seals, although any suitable seal will work. Although two pistons per bore are depicted herein, it will be appreciated that many teachings of this invention may be used wherein single or more than two pistons per bore are used.

Each piston 10a, 12a, has an associated master jaw 18a and 20a disposed within a jaw track or way 22a formed in face 4a. The surface of jaw track 22a may be hardened to improve its wear characteristics. In one embodiment, body 4 was made of 1045 steel and flame hardened. Flame hardening is economical and results in less distortion than other heat treatments.

Figure 5:
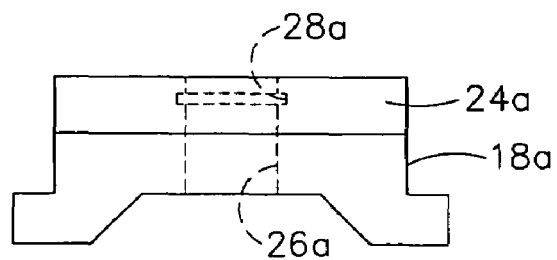
FIG. 5 is an end view of a master jaw.
Figure 6:
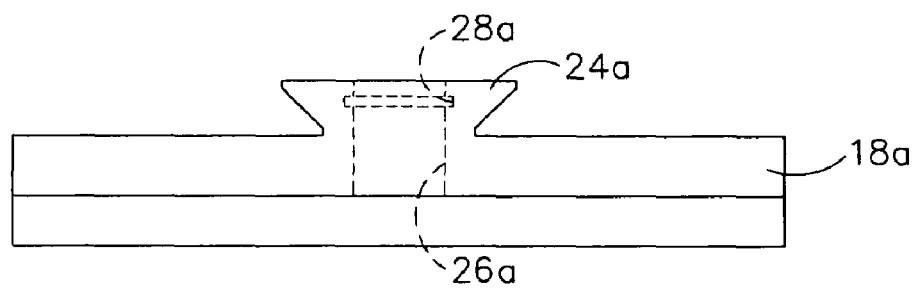
FIG. 6 is a side view of a master jaw.

The construction of each master jaw is the same. As visible in FIG. 2, jaw track 22a is shaped complementarily to master jaw 18a and 20a to permit the master jaws to slide freely therein. Master jaw 18a includes two outwardly depending legs 19a which track 22a wraps around, retaining master jaw 18a therein. An alternative leg construction is depicted in FIG. 5. Any master jaw/jaw track configuration which permits the master jaw to slide freely while retained by the jaw track may be used.

Referring to FIGS. 5–8, master jaw 18a includes dove-tail 24a extending upwardly, disposed transverse to the longitudinal axis of jaw track 22a, which is the axis of travel of master jaw 18a within jaw track 22a. Master jaw 18a includes bore 26a with internal ring groove 28a.

Figure 1A:
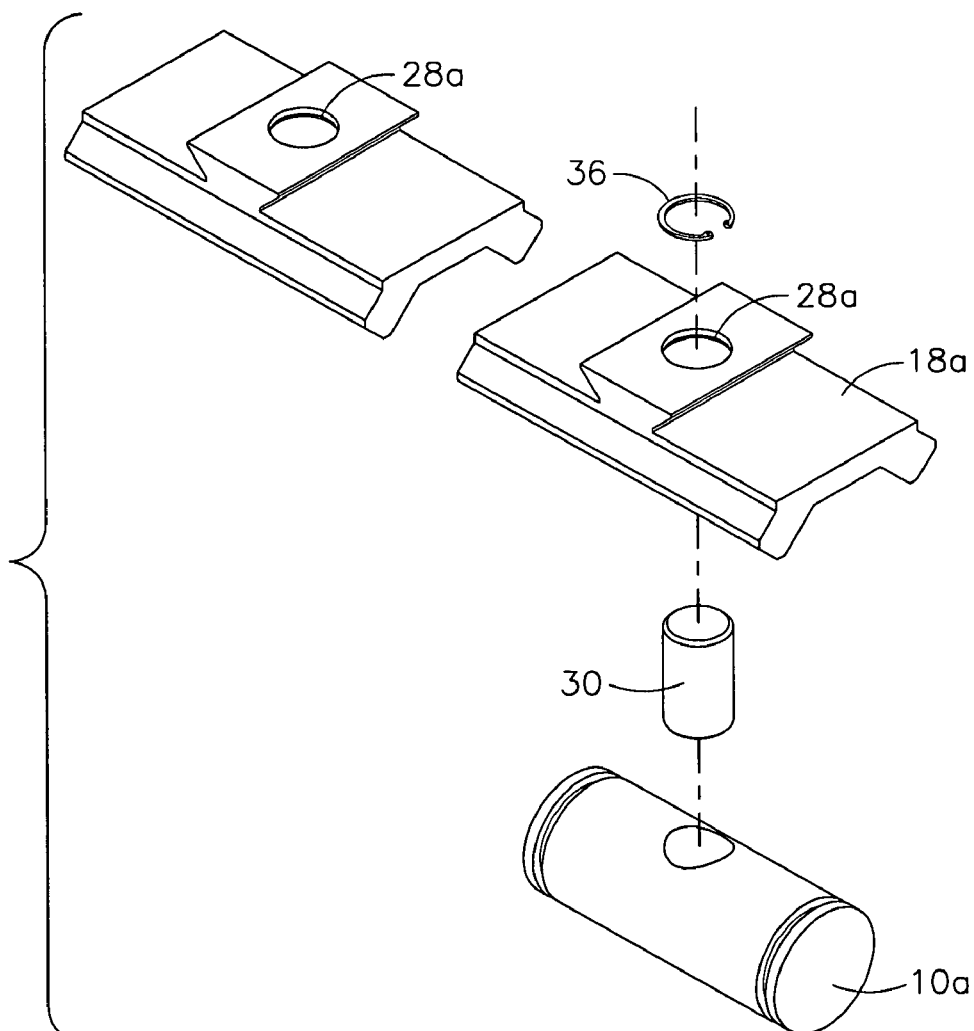
FIG. 1A is an exploded assembly view illustrating the connection between the piston, link pin and master jaw.

As can be seen in FIG. 1A and FIG. 3, master jaw 18a is connected to piston 10a by pin 30 disposed within bore 26a. Pin 30 is a ¾ inch diameter hardened steel pin. To assemble the piston, pin and master jaw together, piston 10a is disposed within bore 8a with bore 26a aligned with bore 34a of piston 10a through opening 32 formed in jaw track 22a. Pin 30 is inserted into bores 26a and 34a having a snug fit. Internal circlip 36 is disposed in groove 28a to ensure pin 30 does not work its way out. In order to remove pin 30 for disassembly, a tapped hole (not shown) is formed in the exposed end of pin 30.

Opening 32 limits the travel of piston 10a due to pin 30 extending therethrough. The size and location of opening 32 must not allow O-rings 14 to travel across opening 32 which would result in leaking hydraulic fluid out opening 32 and a corresponding drop in pressure. In one embodiment, opening 32 allowed a 2¾ inch for piston 10a.

Figure 7:
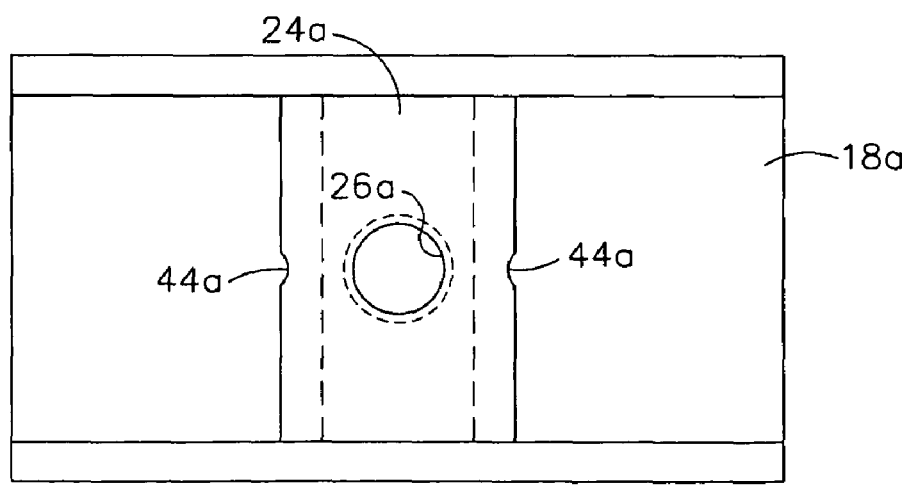
FIG. 7 is a top view of a master jaw.
Figure 8:
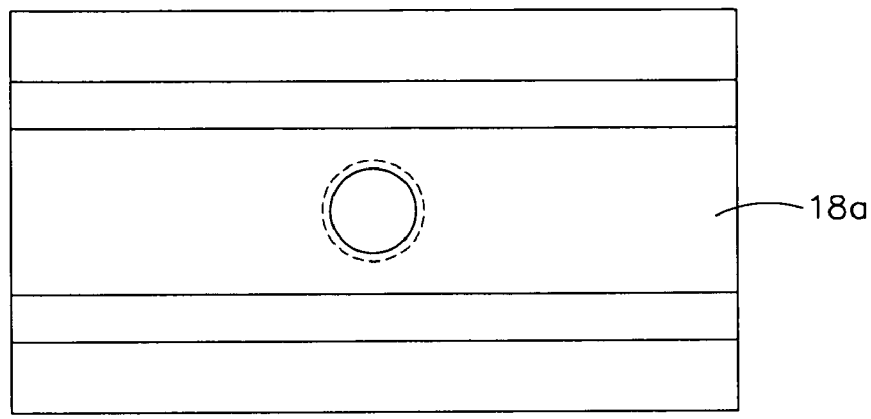
FIG. 8 is a bottom view of a master jaw.
Figure 9:
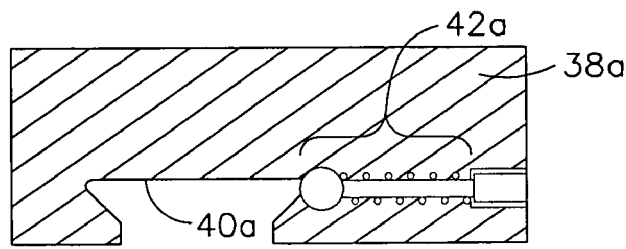
FIG. 9 is a cross-sectional view of a top jaw taken along its midline.
Figure 10:
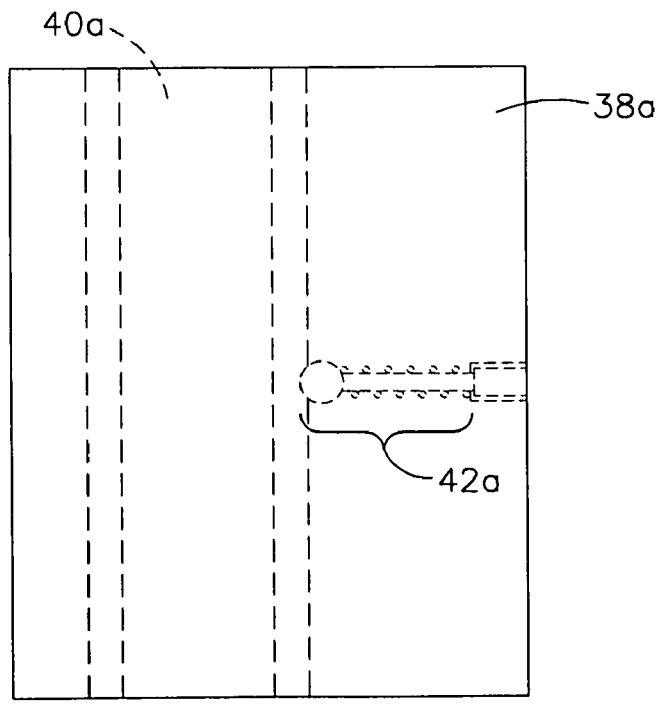
FIG. 10 is a top view of the top jaw.

As shown in FIG. 3, master jaw 18a carries top jaw 38a. FIGS. 9 and 10 illustrate top jaw 38a, which includes dove-tail notch 40a which is sized complementary to dove-tail 24a. Top jaw 38a includes a spring loaded ball detent 42a disposed within a bore formed in top jaw 38a. Spring loaded ball detent engages one of notches 44a in dove tail 24a with enough force to prevent top jaw 38a from sliding along dove-tail 24a while in use. As seen in FIG. 7, dove tail 24a has notches 44a on opposite sides. This allows the orientation of top jaw 38a to be reversed with respect to master jaw 18a. As can be seen in FIGS. 9 and 10, dove-tail notch 40a is not on the center line of top jaw 38a. This construction provides flexibility in conjunction with the dual action of the pistons, as described below.

The use of the dove-tail connection between master jaw 18a and top jaw 38a forces top jaw 38a downwardly when it exerts a clamping force on the work piece. It also allows the top jaw to be changed quickly via the snap on configuration. Other connections between top jaw 38a and master jaw 18a may be used.

Figure 1B:
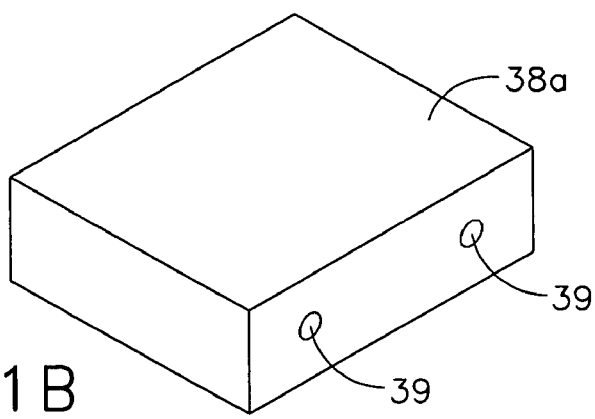
FIG. 1B illustrates the top jaw.

Top jaw 38 may be configured to have another jaw attached to it, such as is depicted by threaded holes 39 shown in FIG. 1B.

Referring to FIG. 3, vise 2 includes fixed jaw 48a securely attached to face 6a, located thereon by dowel pins (not shown) and secured thereto by bolts (not shown). Each face 6a–d may have one or more fixed jaws against which each top jaw pair may clamp. FIG. 3 illustrates two positions at which dead jaws may be disposed. Fixed jaw 48a is disposed adjacent one end of vise 2 on face 6a. Another fixed jaw (not shown) could be disposed adjacent the opposite end of vise 2 on face 6a. In this configuration, the top jaws (and associated master jaws and pistons) are urged outwardly from the center of vise 2 to clamp workpieces against the fixed jaws at either end. On face 6c, fixed jaw 48c is shown disposed in the center of vise 2. In this configuration, the top jaws (and associated master jaws and pistons) are urged inwardly from the center of vise 2 to clamp workpieces against the fixed jaw in the middle. Alternatively, the fixed jaw may be omitted and a workpiece clamped between two top jaws. Also, a tooling plate (not shown) carrying workpieces may be secured to vise 2 through dove tail notches formed in the tooling plate to be carried by the master jaws. The position of fixed jaws, or their absence, may vary from face to face.

Figure 11:
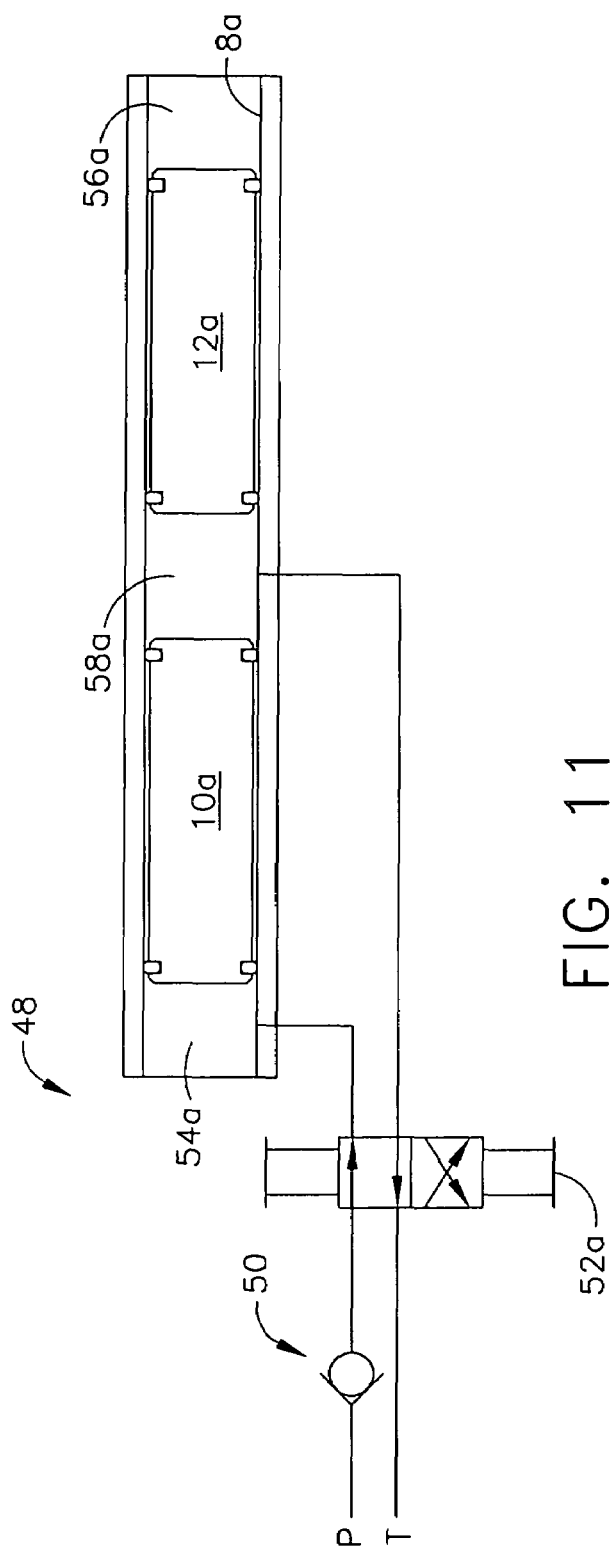
FIG. 11 is a schematic diagram of the hydraulic circuit of a hydraulic vise constructed in accordance with the present invention.

Referring to FIG. 11, a schematic diagram of hydraulic circuit 48 for one bore of vise 2 is depicted. Each bore has a similarly plumbed, separately operable hydraulic circuit. Hydraulic circuit includes a source of pressurized hydraulic fluid (such as a pump), indicated by P, and a return to tank (or reservoir) line, indicated by T. The pressure would typically be set manually by the operator at the source pump. Check valve 50 is located in the pressurized side P upstream of valve 52a. Valve 52a includes two positions which either directs the pressurized fluid to the outside cavities 54a and 56a of bore 8a and the return from interior cavity 58a to tank T, or directs the pressurized fluid to interior cavity 58a and the return from outside cavities 54a and 56a to tank T. When outside cavities 54a and 56a are pressurized, the associated master jaws and top jaws are urged inwardly toward each other. When inside cavity 58a is pressurized, the associated master jaws and top jaws are urged outwardly. Valve 52a may be left in between its two positions, sealing the pressure and holding the jaws in position exerting a clamping force as desired. Check valve 50 prevents a reduction in pressure in the vise side of the circuit in the event that valve 52a is left in either of its two positions.

Figure 12:
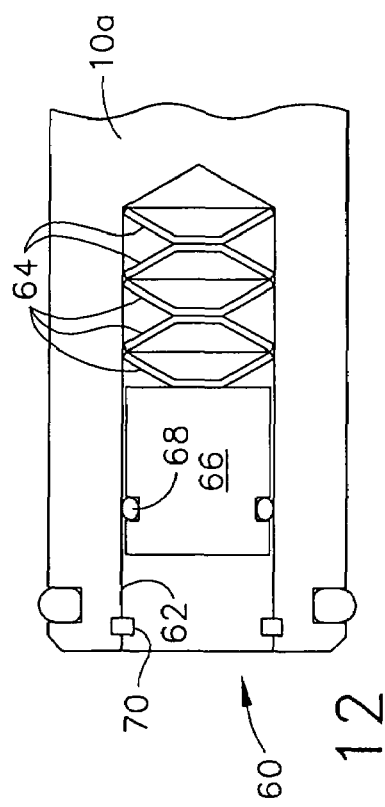
FIG. 12 is an enlarged, diagrammatic, fragmentary view of an accumulator disposed in a piston.

Loss of even a slight amount of hydraulic fluid from the pressurized side of the clamps can greatly reduce the pressure and concomitantly the clamping force. Therefor, an accumulator may be incorporated in the hydraulic circuit. Referring to FIG. 12, an accumulator 60 is diagrammatically shown disposed in bore 62 in an end of piston 10a. Accumulator 60 includes a series of Belleville washers 64 and piston 66 with O-ring 68 disposed in bore 62. Internal ring 70 retains accumulator in bore 62. Although each end of each piston may have an accumulator formed therein, it is not necessary as it adds cost. Preferably, an accumulator is included in either or both outside cavities 54a and 56a, and in interior cavity 58a. This provides accumulation to the pressure side regardless of the position of valve 52a.

Referring to FIG. 1, vise 2 may be rotatably supported so as to permit each face 6a–d to be rotated into an appropriate position so workpieces on each face 6a–d may be operated on, such as being machined. In the configuration shown, end 2a of vise 2 is supported by fourth axis indexer 72. Indexer 72 is controlled, for example, by the machining center to rotate vise 2 to the desired positions. The other end 2b of vise 2 is connected to tail stock 74, such as is described in inventor's copending patent application Ser. No. 08/970, 362, filed Nov. 14, 1997 for Tail Stock Mechanism, the disclosure of which is incorporated herein by reference. Tail stock 74 includes the source of pressurized hydraulic fluid which is delivered to vise 2 through ports in end 2b which lead to the respective outside and interior cavities. Tail stock 74 includes valves 76a–d (two shown in FIG. 1), which correspond to valves 52a–d of the hydraulic circuit depicted in FIG. 11. Alternatively, the hydraulic connection may be provided independent of tail stock 74.

Figure 13:
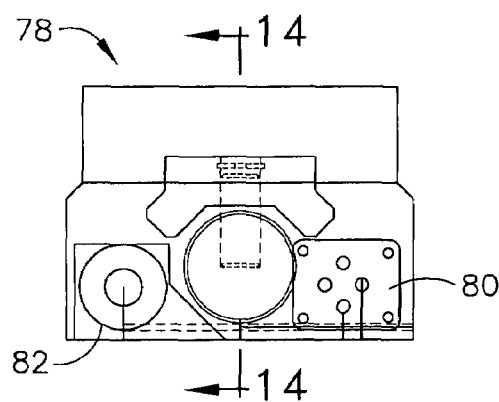
FIG. 13 is an end view of an alternative embodiment of the present invention.
Figure 14:
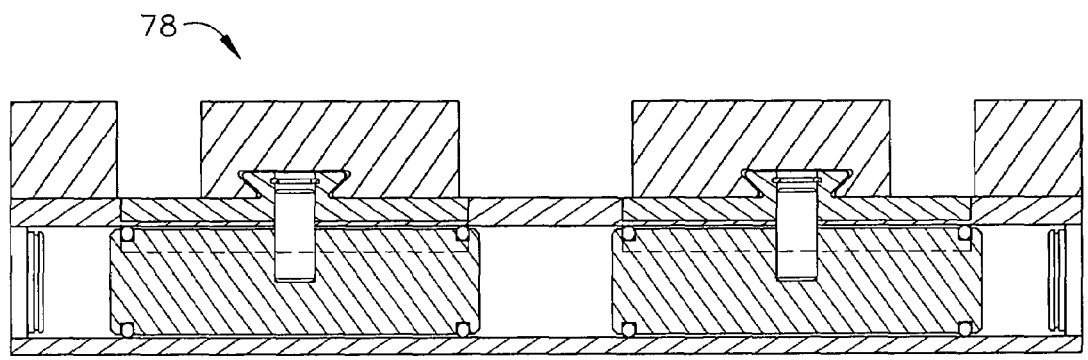
FIG. 14 is a cross-sectional view of the alternate embodiment taken along line 14—14 of FIG. 13.
Figure 15:
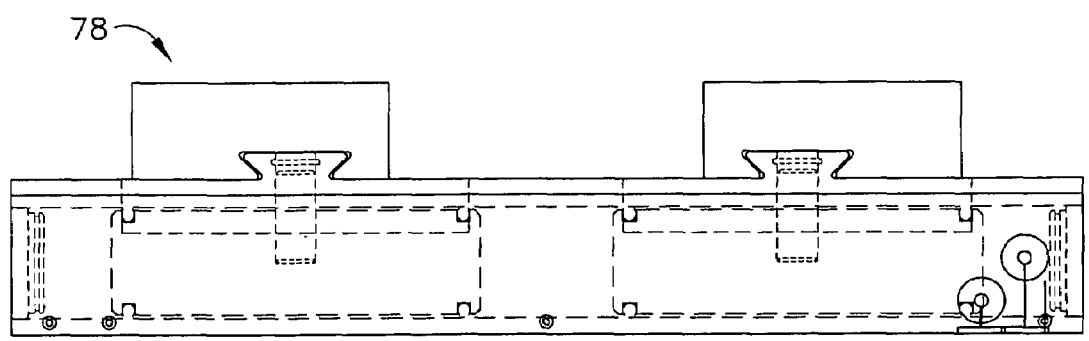
FIG. 15 is a view similar to FIG. 14 showing a fixed jaw in the center, and illustrating some of the internal passageways.
Figure 16:
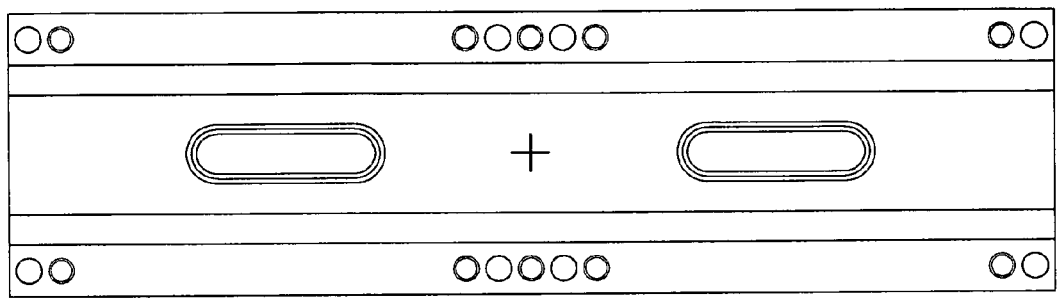
FIG. 16 is a top view of the vise of FIG. 13.
Figure 17:
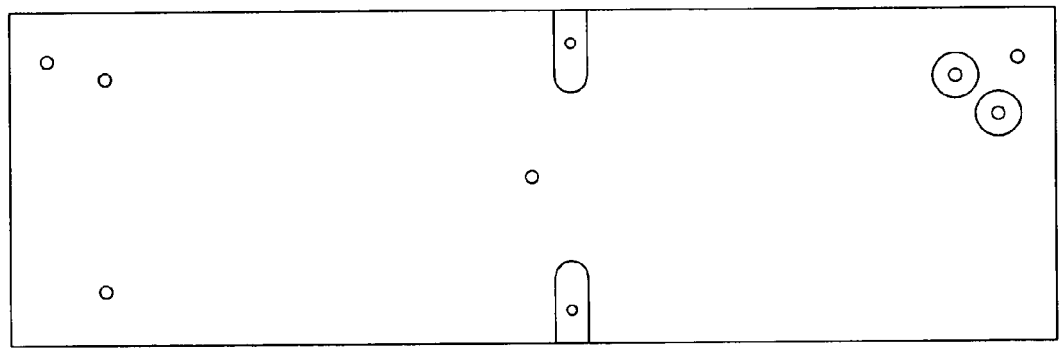
FIG. 17 is a bottom view of the vise of FIG. 13.

Vise 2 may have 4 clamping faces as shown in FIG. 1, or may have more or less: Vise 2 may be one sided, two sided, three sided, five sided, six sided, etc. Referring to FIGS. 13–17, vise 78 is depicted as one sided, usable, for example, on any machining center, drill press, milling machine, etc. They can be stacked next to each other so that internal hydraulic porting can become like a built in manifold from vise to vise through a nipple O-ring sealed to each vise, with the vises bolted next to each other on the machine tool table. Vises can also be bolted on tombstone blocks mounted on pallets. The uses are basically limitless, and the number of faces depends on the requirements of the particular use. The construction is the same as depicted herein for the four sided vise 2, and will not be discussed in detail. As shown in FIG. 13, vise 78 includes a valve mounting face 80 to which the control valve (not shown) would be attached. A pressure gauge 82 may also be included. Since vise 78 has a single face, there typically would not be a reason for it to be mounted rotatably, and therefor it would most likely not be mounted to tail stock 74. In such a case, vise 78 would have a built-in control valve and pressure gage.

In summary, numerous benefits have been described which result form employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The invention claimed is:

1. A vise comprising:
 (a) A body, said body having:
  (i) at least one external face;
  (ii) at least one respective internal bore formed in said body, said at least one respective internal bore including a sidewall; and
  (iii) said at least one respective internal bore including a respective opening extending through said sidewall;
 (b) a piston disposed at least partially in a respective one of said at least one internal bore;
 (c) at least one respective master jaw operatively connected to said piston;
 (d) a first cavity of said internal bore, wherein actively pressurizing said first cavity urges said piston in a first direction; and
 (e) a second cavity of said internal bore, wherein actively pressurizing said second cavity urges said piston in a second direction.

2. The vise of claim 1 including a respective top jaw carried by said at least one master jaw.

3. The vise of claim 1, wherein said at least one external face comprises a planar face.

4. The vise of claim 1, further comprising a respective member operatively connecting said at least one respective master jaw with said at least one respective piston, said respective member extending through said respective opening.

5. The vise of claim 1, further comprising a valve operable to selectively direct the pressurized fluid to said first cavity.

6. The vise of claim 5, wherein said valve is operable to selectively direct the pressurized fluid to said second cavity.

7. A vise comprising:
 (a) a body having:
  (i) at least one external face; and
  (ii) at least one respective internal bore formed in said body;
 (b) at least one respective piston disposed in a respective one of said at least one internal bore;
 (c) a respective member,
 (d) at least one respective master jaw, operatively connected to a respective one of said at least one piston with said respective member, whereby said master jaw and said respective one of said at least one piston move concomitantly; and
 (e) at least one respective top jaw attached to said at least one respective master jaw.

8. The vise of claim 7, wherein said at least one respective top jaw is carried by said at least one respective master jaw.

9. The vise of claim 7, comprising a connection between said at least one respective top jaw and said at least one respective master jaw, said connection being configured to urge said at least one respective top jaw against said at least one external face as a result of force urging said at least one respective top jaw against said at least one respective master jaw.

10. The vise of claim 9, wherein said connection is a dove tail connection.

11. The vise of claim 7, further comprising at least one respective jaw track in said at least one external face, where said at least one respective master jaw is partially disposed in said at least one respective jaw track and is operably configured to slide therein.

12. The vise of claim 11, wherein said at least one respective jaw track further comprises two oppositely extending legs.

13. The vise of claim 12, wherein said two oppositely extending legs depend downwardly away from each other, at an oblique angle relative to said external face.

14. A vise comprising:
(a) a body having:
  (i) at least one external face; and
  (ii) at least one respective internal bore formed in said body;
(b) at least one respective piston disposed at least partially in a respective one of said at least one internal bore;
(c) a respective member;
(d) at least one respective master jaw operatively connected to a respective one of said at least one piston with said respective member, whereby said master jaw and said respective one of said at least one piston move concomitantly;
(e) a first cavity, wherein actively pressurizing said first cavity urges said at least one respective piston in a first direction; and
(f) a second cavity, wherein actively pressurizing said second cavity urges said at least one respective piston in a second direction.

15. The vise of claim 14, including a respective top jaw carried by said at least one respective master jaw.

16. The vise of claim 15, comprising a connection between said respective top jaw and said at least one respective master jaw, said connection being configured to urge said respective top jaw against said at least one external face as a result of force urging said respective top jaw against said at least one respective master jaw.

17. The vise of claim 16, wherein said connection is a dove tail connection.

18. A vise comprising:
(a) A body, said body having:
  (i) at least one external face;
  (ii) at least one respective internal bore formed in said body, said at least one respective internal bore including a sidewall; and
  (iii) said at least one respective internal bore including a respective opening extending through said sidewall;
(b) a first piston disposed at least partially in said at least one internal bore;
(c) a first master jaw operatively connected to said first piston;
(d) a second piston disposed at least partially in said at least one internal bore;
(e) a second master jaw operatively connected to said second piston;
(f) an internal cavity, wherein said internal cavity includes the region of said at least one internal bore between said first piston and said second piston, wherein actively pressurizing said first cavity urges said first piston and said second piston apart;
(g) a first outside cavity, wherein said outside cavity includes the region of said at least one internal bore between said first piston and a first end of said at least one internal bore, wherein actively pressurizing said first outside cavity urges said first piston inward; and
(h) a second outside cavity, wherein said outside cavity includes the region of said at least one internal bore between said second piston and a second end of said at least one internal bore, wherein actively pressurizing said second outside cavity urges said second piston inward.

19. The vise of claim 18, wherein said first master jaw is associated with a first top jaw and said second master jaw is associated with a second top jaw.

* * * * *